(12) United States Patent
Kleeberger et al.

(10) Patent No.: US 10,185,093 B2
(45) Date of Patent: Jan. 22, 2019

(54) APPARATUS AND METHODS FOR FURCATING FIBER OPTIC CABLES

(71) Applicant: AFL IG LLC, Kent, WA (US)

(72) Inventors: Terry Kleeberger, Tacoma, WA (US); Artur Bureacov, Federal Way, WA (US)

(73) Assignee: AFL IG LLC, Kent, WA (US)

( * ) Notice: Subject to any disclaimer, the term of this patent is extended or adjusted under 35 U.S.C. 154(b) by 0 days.

(21) Appl. No.: 15/522,744

(22) PCT Filed: Oct. 27, 2015

(86) PCT No.: PCT/US2015/057441
§ 371 (c)(1),
(2) Date: Apr. 27, 2017

(87) PCT Pub. No.: WO2016/069514
PCT Pub. Date: May 6, 2016

(65) Prior Publication Data
US 2017/0336568 A1    Nov. 23, 2017

Related U.S. Application Data

(60) Provisional application No. 62/069,218, filed on Oct. 27, 2014.

(51) Int. Cl.
*G02B 6/36* (2006.01)
*G02B 6/44* (2006.01)
*G02B 6/38* (2006.01)
*G02B 6/42* (2006.01)
*G02B 6/293* (2006.01)

(52) U.S. Cl.
CPC ......... *G02B 6/3616* (2013.01); *G02B 6/3874* (2013.01); *G02B 6/4248* (2013.01); *G02B 6/4463* (2013.01); *G02B 6/4471* (2013.01); *G02B 6/29317* (2013.01)

(58) Field of Classification Search
CPC ............... G02B 6/29317; G02B 6/4471; G02B 6/3874; G02B 6/3878; G02B 6/4248; G02B 6/3616; G02B 6/4463
USPC ................... 385/100–115, 137, 135
See application file for complete search history.

(56) References Cited

U.S. PATENT DOCUMENTS

| 2008/0138020 A1* | 6/2008 | Robinson | G02B 6/4471 385/106 |
| 2013/0294733 A1* | 11/2013 | Wright | G02B 6/2558 385/99 |
| 2014/0241678 A1* | 8/2014 | Bringuier | G02B 6/02357 385/113 |

* cited by examiner

*Primary Examiner* — Michael Mooney
(74) *Attorney, Agent, or Firm* — DWC Law Firm, P.S.; David Chen

(57) ABSTRACT

Methods and apparatus for furcating fiber optic cables are provided. In some embodiments, a molded furcation tube array is generated by compressing rearward end portions of a plurality of furcation tubes together, and heating at least a portion of the rearward end portions to form a molded portion of the furcation tube array. Reinforcing filaments can be bonded into and/or throughout the molded portion. The molded portion can have internal chambers in communication with separate furcation tubes of the furcation tube array, in which optic fibers can be slidably retained, and the molded portion can be fixedly coupled to a housing, which in turn, can be coupled to a cable trunkline. Optic fibers can piston or slide longitudinally within the trunkline housing and molded portion.

4 Claims, 4 Drawing Sheets

APPARATUS AND METHODS FOR FURCATING FIBER OPTIC CABLES

CROSS REFERENCE TO RELATED APPLICATION(S)

This application claims priority to U.S. Provisional Patent Application No. 62/069,218, filed Oct. 27, 2014, which is incorporated herein by reference in its entirety.

BACKGROUND

1. Technical Field

The present disclosure relates to optic fibers, and in particular, apparatus and methods for furcating fiber optic cables.

2. Description of Related Art

Fiber optic cables are frequently used for interconnecting computer systems (e.g., servers) because these cables can simultaneously carry a large amount of data without excessive transmission loss. A trunkline is a type of fiber optic cable that typically includes multiple optic fibers and strength filaments (e.g., Kevlar yarns) arranged lengthwise and encased in a protective jacket (e.g., plastic or metal tubing). At each end of the trunkline, the optic fibers are furcated into individual cables that terminate at individual connectors.

One conventional technique for furcating the trunkline uses heat-shrink tubing and epoxy. FIG. 1, for example, illustrates a prior art furcated cable 100 having a furcation unit 101 with a heat-shrink tube 102 encasing an epoxy 104, a trunkline 106 connected to one end of the furcation unit 101, and furcation tubes 112 projecting from the other end of the furcation unit 101. The trunkline 106 includes a cable jacket 113 encasing portions of optic fibers 108 and cable filaments 110. Each furcation tube 112 includes a tube jacket 116 encasing tube filaments 114 and one of the optic fibers 108. The heat-shrink tube 102 overlaps both the trunkline 106 and the furcation tubes 112 to enclose a portion of the optic fibers 108 and filaments 110, 114. The epoxy 104 rigidly binds the enclosed optic fibers 108 and filaments 110, 114 inside the heat-shrink tube 102. Each optic fiber 108 extends from the trunkline 106, through the epoxy 104, and out from the furcation tubes 112. The optic fibers 108 can easily be damaged during installation, manufacturing, and other handling processes. For example, installing the furcated cable 100 during the connection of servers typically includes pulling on the cable jacket 113 to draw the trunkline 106 through cable trays, conduits, and other channelways. The furcation unit 101 transmits the pulling force directly to the optic fibers 108 because the epoxy 104 rigidly binds the optic fibers 108 to the cable jacket 113. The transmitted force can damage the fragile optic fibers 108.

U.S. Pat. Nos. 7,494,284, 7,270,485, and 8,172,465, disclose methods and devices for furcating fiber optic cables in a manner that reduces risk of damage to the optic fibers. For example, in one aspect of these disclosures, a furcated cable can include a bundled cable (e.g., a trunkline), furcation tubes, and a furcation unit positioned between the bundled cable and the furcation tubes. A plurality of optic fibers are slidably disposed in the bundled cable, furcation unit, and the furcation tubes, such that the optic fibers can move, or "piston," in a longitudinal direction. Although various designs disclosed in these patents are effective for reducing tensile forces applied to the optic fibers to reduce risk of damaging the fragile optic fibers, they can be bulky and labor intensive to employ.

BRIEF SUMMARY

In some embodiments of the present disclosure, a fiber optic cable furcation assembly is provided comprising a trunkline containing a plurality of longitudinally extending optic fibers, with a forward end portion of the trunkline being attached to a rearward entrance portion of a housing, and with the plurality of optic fibers extending forward from the trunkline, through the housing, and into corresponding internal chambers in a molded array of furcation tubes. The molded array can comprise a group of furcation tubes that have been heat molded together in an array. In a molded portion of the molded array, reinforcing filaments of the furcation tubes can be bonded into tube jackets of the furcation tubes. This can allow an outside surface of the molded portion to be directly attached to the housing by an adhesive (e.g., glue), while the molded portion is reinforced by the strength of the filaments that have been bonded into the tube jackets of the array. Also, the trunkline can be fixedly coupled to the housing without binding the optic fibers. The plurality of optic fibers can thus be slidably retained within the trunkline, housing, and molded array, without any bonding or fixed coupling of the optic fibers, and in this manner, tensile load on the optic fibers is limited during cable installation, adjustment, or otherwise, to protect the optic fibers.

In some embodiments of the present disclosure, the molded furcation tube array includes both a molded portion and an unmolded portion of furcation tubes, and wherein the molded portion is coupled to the housing but the unmolded portion extends forward away from the housing. The molded portion, which can be a rearward portion (relative to the drawings herein) of the molded array, can be coupled to the housing by being at least partially inserted into a forward, or exit, opening of the housing and an external surface of the molded portion can be fixedly coupled to an internal sidewall of the housing by an adhesive. Also, in some embodiments, the trunkline is fixedly coupled to a rearward portion of the housing, such as a neck of the housing, by a crimp ring that crimps at least a plurality of reinforcing filaments of the trunkline against the neck of the housing.

In some embodiments of the present disclosure, methods of constructing a cable assembly are provided comprising: arranging a plurality of furcation tubes in an array wherein rearward portions of the furcation tubes are arranged in generally parallel fashion and adjacent to one another, compressing at least the rearward portions together, and heating the rearward portions of the furcation tubes to deform at least a portion of each of the furcation tubes to form a molded portion of the array. The furcation tubes can each include a tube jacket, reinforcing filaments, and a buffer tube concentrically disposed in the tube jacket. The tube jackets and buffer tubes in the heated portion of the array can be deformed by the heating such that the reinforcing filaments in the furcation tubes are bonded into the tube jackets (and buffer tubes) to form the molded portion of the array, and moreover, the plurality of furcation tubes also bond together in the heated portion to form the molded portion of the array. Fiber optic cables can then be threaded through internal chambers in the molded portion to be guided into the unmolded portion of the array, comprising separate furcation tube sections (e.g., forward portions of the array). That is, in some embodiments, the internal chambers of the molded portion each lead into a separate, and integral, unmolded furcation tube sections in the unmolded portion of the array. The molded portion can then be directly coupled to a housing or breakout casing, with the benefit of strength imparted by the reinforcing filaments molded therein. Also, prior to heating of the compressed portion of the array, pins can be inserted into rearward facing openings in the furcation tubes to extend through at least the rearward portions in order to prevent the inner tube chambers from collapsing, thus ensuring the presence of internal chambers in the molded portion. The pins can also help press the reinforcing filaments into the tubes, as the tubes are deformed under heat while being compressed.

DETAILED DESCRIPTION

In the present disclosure, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures, techniques, methods and materials of construction have not been described in detail to avoid unnecessarily obscuring the descriptions of the embodiments of the disclosure.

In the present disclosure, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms, and variants thereof, are intended to be construed as non-limiting. The definitions in this paragraph are intended to apply throughout this disclosure unless otherwise expressly stated.

Various embodiments in this disclosure are described in the context of use with optic fibers and particular cable configurations, for purposes of illustration. However, as will be appreciated by those skilled in the art after reviewing this disclosure, various others cable configurations for optic fibers may also be suitable for use with the apparatus and methods disclosed herein, which may be modified in the spirit of this disclosure to be adapted to such variations.

Figure 1:
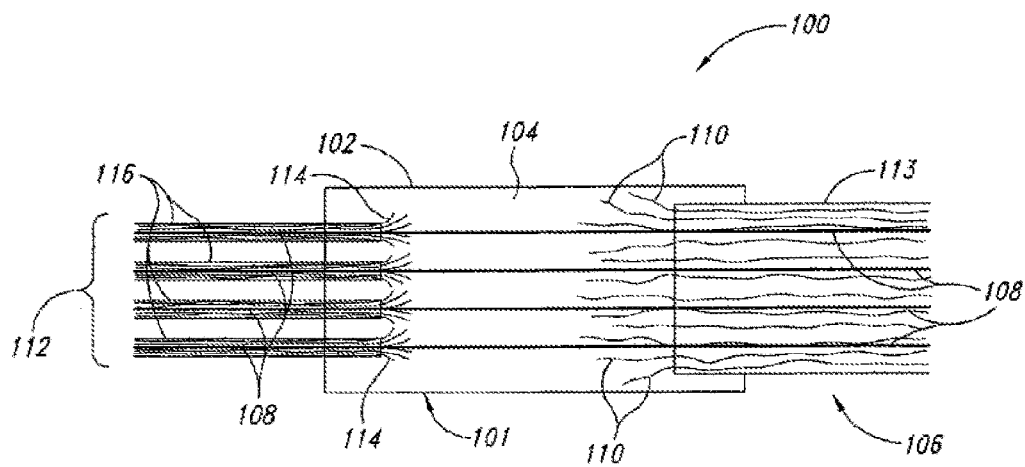
FIG. 1 is a simplified cross-sectional view of a furcated cable in accordance with the prior art.
Figure 2:
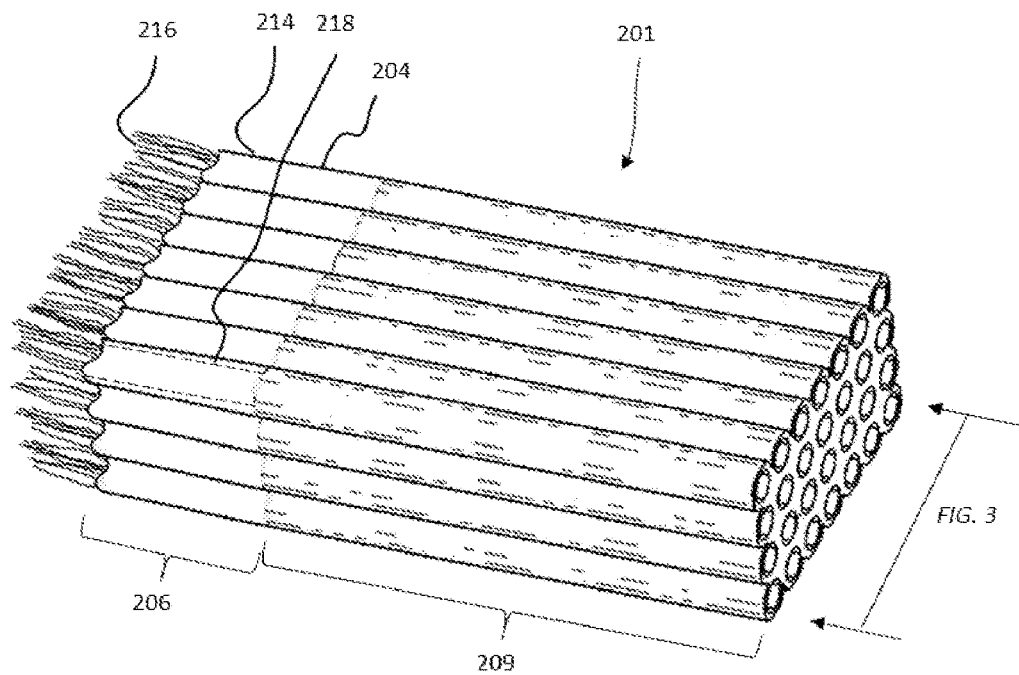
FIG. 2 is a partial perspective view of a molded array of furcation tubes, having a molded and unmolded portion, in accordance with some embodiments of the present disclosure.

Referring to FIG. 2, in some embodiments, a molded array 201 of furcation tubes is provided and can comprise a plurality of furcation tubes 204, molded together at a molded portion 209 of the molded array 201. The molded portion 209 can be a rearward portion (relative to FIG. 2) of the molded array 201. Each furcation tube 204 can include a tube jacket 214 and reinforcing filaments 216 (e.g., Kevlar threads) extending longitudinally therethrough. In some embodiments, longitudinally extending buffer tubes 218 can also be provided within each tube jacket 214 in concentric fashion. In the molded portion 209, the reinforcing filaments 216 can be bonded into deformed material of the tube jacket 214 and buffer tubes 218, which have been deformed through heat, as described further below. In the unmolded portion 206, the tube filaments 216 can extend longitudinally between the tube jacket 214 and the buffer tubes 218, with the tube filaments 216 at least partially surrounding the buffer tube 218 within each tube jacket 214. The relative lengths of the unmolded portion 206 and molded portion 209 of the array 201, depend on the application; however, in most cases, the unmolded portion 206 will be longer (not illustrated) to allow slack/flexibility for manipulating the furcation tubes 204, to connect terminating ends of optic fibers to appropriate connections.

The tube jackets 214 and/or buffer tubes 218 comprising the furcation tubes 204 can be constructed from plastic, or other suitable materials, such as, for example, Hytrel®. The tube filaments, or reinforcing filaments 216, can include, or consist of, strength fibers constructed from Kevlar, nylon, polyester, or other suitable materials.

Figure 3:
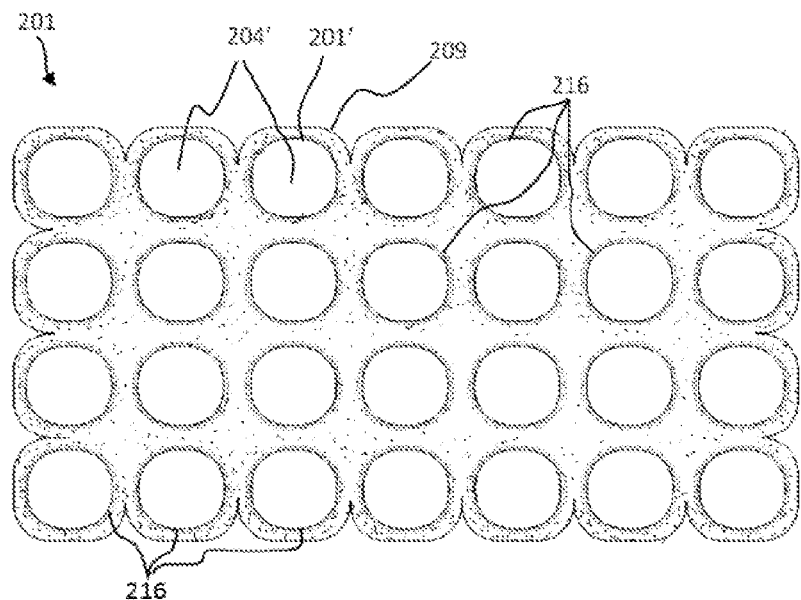
FIG. 3 is a rear elevation view from line FIG. 3 in FIG. 2.
Figure 4:
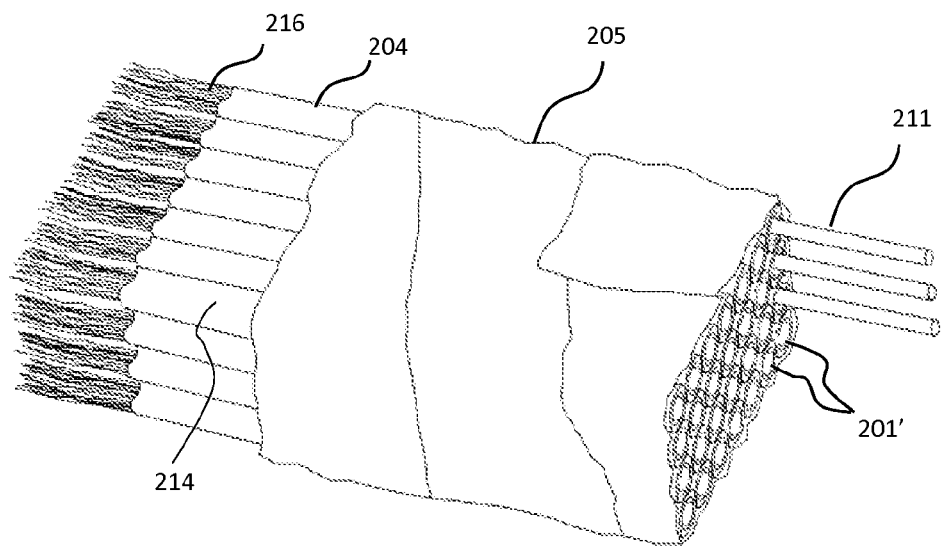
FIG. 4 is a partial perspective view of an array of furcation tubes with rearward portions thereof being prepared for heating to generate the molded array in FIG. 2, in accordance with some embodiments of the present disclosure.

In some embodiments, the molded portion 209 of the molded array 201, is formed by first arranging and compressing rearward portions of a plurality of furcation tubes 204 together, in side-by-side, or parallel, fashion, as shown in FIG. 4. Rearward end openings 201' of the furcation tubes 204 can be approximately aligned. In some embodiments, an adhesive material, such as a tape 205, can be used to retain the rearward portions together in this compressed configuration, under inward pressure applied from the tape 205 (the tape 205 is covering the rearward portions in FIG. 4). The taped portion can then be heated in this compressed configuration to cause the tube jackets 214 of the furcation tubes 204 to mold together into a molded portion 209, such as that shown in FIGS. 2 & 3. In some embodiments, the heat treatment combined with the compression deforms the tube jackets 214 and causes the reinforcing filaments 216 to be molded into, or otherwise firmly bonded into the material of construction of the tube jacket 214 and/or buffer tubes 218 (if provided), in each of the furcation tubes 204 of the molded section 209. Moreover, in some embodiments, wherein buffer tubes 218 are concentrically disposed within each tube jacket 214, the buffer tubes 218 can also be molded into, or otherwise bonded to, the corresponding tube jackets 214, by the heat treatment. For example, as shown in FIG. 3, the tube filaments 216 have been bonded into the material that formed the separate tube jackets 214, and the material that formed the separate tube jackets 214 has also been fully or partially bonded together in the molded portion 209. In other embodiments, the heat or molding process can be imparted by various different methods, such as, for example, ultrasonic welding.

Referring to FIG. 4, in some embodiments, pins 211 made of metal, or other material that will not deform during the heat treatment, are longitudinally inserted into rearward portions of each of the furcation tubes 204 through rearward openings 201' thereof, prior to heat treating, to prevent the interior chambers of the furcation tubes 204 from collapsing during heating. The pins 211 can each have an outer diameter less than a resting internal diameter of the furcation tubes 204 prior to heating, but can be selected to be large enough to retain a sufficient internal diameter of internal chambers 204' of the molded portion 209 through which to accommodate optic fibers. Heating temperature and time for heating the rearward portions compressed by tape 5 in the array to form the molded portion 209 can be selected based on the materials of construction of the furcation tubes 204; however, in some embodiments, the rearward portions are heated up to 200-250 degrees F., for 5-8 minutes. In other embodiments, the temperature goals can be higher or lower, and the heating time can be longer or shorter. In some embodiments, the tape 5, which can be silicone tape, is selected so as not to mold into the furcation tubes 204 during heating, and thus, after heating to form the molded portion 209 of the molded array 201, the tape 205 can be easily removed, as will be appreciated by those skilled in the art after reviewing this disclosure.

Figure 5:
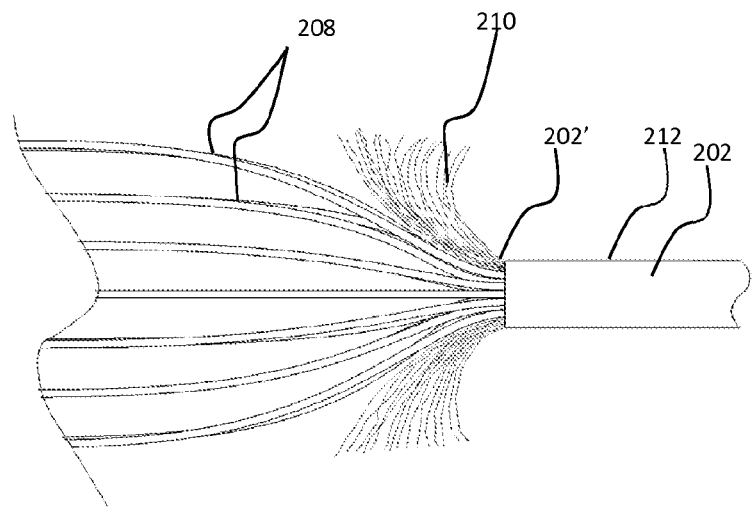
FIG. 5 is an overhead plan view of a prior art trunkline with optic fibers extending therefrom in preparation for assembling a cable assembly in some embodiments of the present disclosure.

Referring now to FIG. 5, a jacket 212 of a trunkline 202, or bundled cable 202, can be cut at a terminating end portion 202' thereof, in order to fanout the optic fibers 208 contained therein in preparation for assembling a furcation assembly 220 (See, e.g., FIG. 8) that utilizes the molded array 201 of furcation tubes.

Figure 6:
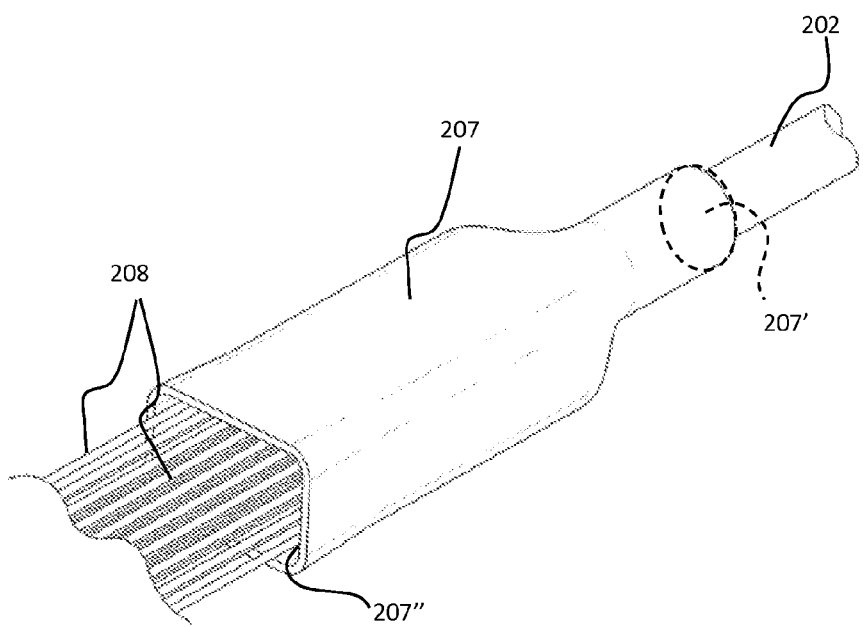
FIG. 6 is a perspective view of a housing having received the optic fibers from FIG. 5, during assembly of a cable assembly for some embodiments of the present disclosure.

Referring to FIG. 6, in some embodiments, all of the optic fibers 208 of the trunkline 202 can be passed through a housing 207, having an internal chamber, through an rearward or entrance opening 207' of the housing 207, and out through a forward or exit opening 207".

Figure 7:
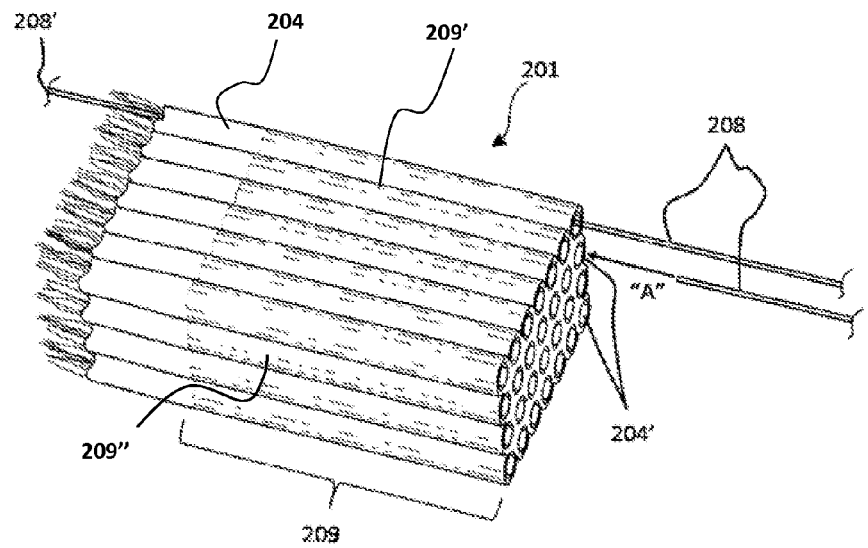
FIG. 7 is a partial perspective view of the molded array of furcation tubes (shown in FIG. 2) receiving optic fibers from the housing (shown in FIG. 6) during assembly of the fiber optic furcation assembly of FIG. 8, in accordance with some embodiments of the present disclosure.

Referring to FIGS. 7 & 3, each of the optic fibers 208 extending from the forward or exit opening 207" of the housing 207, can then be individually (e.g. manually) threaded through a corresponding internal chamber 204' on the molded portion 209 of the molded array 201, in the direction of arrow "A," to be passed through the internal chambers 204' of the molded portion 209, leading to separate furcation tubes 204 in the unmolded portion, to extend out from forward ends of the separate furcation tubes 204, in preparation for being selectively connected at opposite terminal ends 208'.

Figure 8:
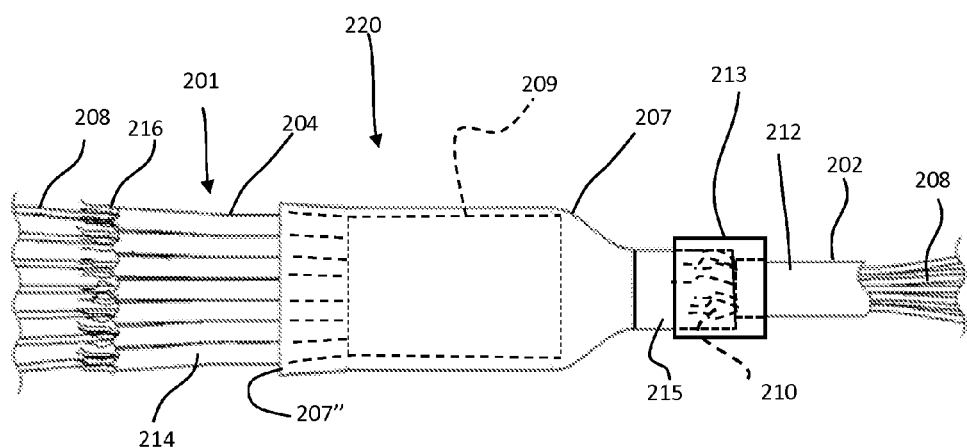
FIG. 8 is an overhead plan view of a fiber optic cable furcation assembly for some embodiments of the present disclosure, in which the molded array of FIG. 7 and the trunkline of FIG. 5, have each been fixedly coupled to the housing, without fixedly binding the optic fibers to the housing, or any of the tubes.

Referring now to FIG. 8, in some embodiments, after all of the optic fibers 208 of the trunkline 202 have been selectively threaded through corresponding internal chambers 204' of the molded array 201, a user can use epoxy or other glue to attach the molded portion 209 to an inside of the housing 207. For example, a user can spread a glue on an external surface of the molded portion 209, such as, for example, on the side 209" and top 209' (See, e.g., FIG. 7) of the molded portion 209, then insert the molded portion 209 through the forward or exit opening 207" of the housing 207, to be snuggly fit inside the housing 207 and to be bonded by the glue to an interior sidewall of the internal chamber of the housing 207, such as shown in FIG. 8. That is, for example, the top 209' and/or side 209" of the molded portion 209 may be pressed snuggly against inside sidewalls of the housing 207. The user can selectively apply the glue in an amount and location on the molded portion 209 that will avoid any contact of the glue with the optic fibers 208 inside the housing 207 when the molded portion 209 is pressed into the housing, as will be appreciated by those skilled in the art after reviewing this disclosure. This will allow the optic fibers 208 to be slidably movable through the furcation tubes 204. Moreover, as shown in FIG. 8, in some embodiments, the trunkline 202 can be attached to the rearward or entrance end portion of the housing 207, by applying a crimp ring 213 to crimp the cable filaments 210 against an outer sidewall of a neck 215 portion of the entrance end of the housing 207, as will be appreciated by those skilled in the art after reviewing this disclosure. In this manner, the optic fibers 208 are longitudinally slidable/movable within the trunkline 202, housing 207, molded portion 209, and furcation tubes 204, while the trunkline jacket 212 and filaments 210, and the furcation tube jackets 214 (which can include buffer tubes) and reinforcing filaments 216, are substantially fixedly retained to the housing 207. This helps ensure that the optic fibers 208 do not bear substantial tensile forces applied to the cable by users during cable installation, adjustment or otherwise, and this reduces risk of damaging the fragile optic fibers. In addition, the methods and apparatus disclosed herein are substantially more compact and less labor intensive than the prior art previously mentioned.

The molded portion 209 has been depicted herein as having a generally rectangular cross section and comprised of four (4) rows of seven (7) tubes per row. However, the depicted example molded portion 209 is not limiting, and as will be appreciated by those skilled in art after reviewing this disclosure, the number of rows of tubes and number of tubes per row can be selectively varied, and/or the cross sectional shape of the molded portion 209 can be selectively varied without deviating from the spirit of this disclosure.

The various embodiments described herein, are presented as non-limiting example embodiments, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," or "some embodiments," means that a particular feature, structure or characteristic described in connection with the embodiment(s) is included in at least one or some embodiment(s), but not necessarily all embodiments, such that the references do not necessarily refer to the same embodiment(s). The particular features may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A method of constructing a cable assembly comprising:
    arranging a plurality of furcation tubes in an array and compressing the furcation tubes together at a heating portion;
    inserting pins into the furcation tubes in the heating portion prior to heating the heating portion; and
    heating the heating portion to deform the furcation tubes and removing the pins from the heating portion after heating the heating portion, and wherein during heating the heating portion reinforcing filaments disposed within the furcation tubes are bonded into tube jackets of the furcation tubes in the heating portion, and wherein the plurality of furcation tubes in the array bond together in the heating portion to form a molded portion of the array.

2. The method of claim 1 further comprising threading optic fibers through chambers in the molded portion of the array, and pushing the optic fibers through to an unmolded portion of the array.

3. The method of claim 2 further comprising inserting the molded portion of the array into a housing, and fixedly coupling the molded portion of the array to the housing using an adhesive.

4. The method of claim 1 wherein compressing the furcation tubes together comprises binding the furcation tubes under pressure using a tape.

\* \* \* \* \*